(12) United States Patent
Dorronsoro Martin et al.

(10) Patent No.: US 8,713,901 B2
(45) Date of Patent: May 6, 2014

(54) METHOD FOR PACKAGING LOW COUNT PACKAGES OF ABSORBENT ARTICLES

(75) Inventors: Zulema Dorronsoro Martin, Colonge (DE); Thomas Luebcke, Enskirchen (DE); Andre Josephine Karel De Saert, Hamme (BE); Clifford Theodore Papsdorf, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 350 days.

(21) Appl. No.: 13/105,219

(22) Filed: May 11, 2011

(65) Prior Publication Data

US 2011/0289886 A1    Dec. 1, 2011

Related U.S. Application Data

(60) Provisional application No. 61/333,322, filed on May 11, 2010.

(51) Int. Cl.
*B65B 35/50* (2006.01)
*B65B 13/20* (2006.01)

(52) U.S. Cl.
USPC .................................. 53/540; 53/529; 53/447

(58) Field of Classification Search
USPC ............ 53/529, 152, 153, 540, 443, 447, 438
See application file for complete search history.

(56) References Cited

U.S. PATENT DOCUMENTS

| | | | |
|---|---|---|---|
| 3,902,587 A * | 9/1975 | Checcucci | 198/419.3 |
| 4,180,154 A | 12/1979 | Andersson | |
| 4,577,453 A * | 3/1986 | Hofeler | 53/438 |
| 4,768,642 A | 9/1988 | Hunter | |
| 5,127,209 A * | 7/1992 | Hunter | 53/439 |
| 5,141,219 A | 8/1992 | Watts et al. | |
| 5,755,317 A | 5/1998 | Holston | |
| 5,768,856 A | 6/1998 | Odenthal | |
| 5,884,749 A | 3/1999 | Goodman | |
| 6,019,213 A | 2/2000 | Schubert | |
| 6,021,886 A | 2/2000 | Remericq | |
| 6,089,820 A | 7/2000 | Talé | |
| 6,149,378 A | 11/2000 | Biondi et al. | |
| 6,223,884 B1 | 5/2001 | Ronchi | |
| 6,260,689 B1 | 7/2001 | Takemoto et al. | |

(Continued)

FOREIGN PATENT DOCUMENTS

| | | |
|---|---|---|
| CN | 1519178 A | 8/2004 |
| CN | 101249899 A | 8/2008 |

(Continued)

OTHER PUBLICATIONS

PCT International Search Report dated Nov. 8, 2011, 7 pages.

*Primary Examiner* — Thanh Truong
*Assistant Examiner* — Eyamindae Jallow
(74) *Attorney, Agent, or Firm* — Abbey A. Lopez; Sarah M. DeCristofaro

(57) ABSTRACT

A method for providing low count packages of absorbent articles in a high speed manufacturing process in which a plurality of absorbent articles are conveyed in series to the infeed of a continuously rotating stacker. The articles are sequentially inserted into cassettes disposed on the stacker such that a plurality of absorbent article containing cassettes is provided. The articles are extracted from the continuously rotating stacker by an angled extractor and packaged into low count packages.

20 Claims, 8 Drawing Sheets

(56) References Cited

U.S. PATENT DOCUMENTS

| | | |
|---|---|---|
| 6,286,290 B1 | 9/2001 | Fluck |
| 6,691,856 B1 | 2/2004 | Prakken |
| 6,698,579 B1 | 3/2004 | Kerr et al. |
| 6,823,981 B2 | 11/2004 | Ogle et al. |
| 6,877,294 B2 | 4/2005 | Hellmann et al. |
| 6,884,016 B2 | 4/2005 | Ogle et al. |
| 6,918,485 B2 | 7/2005 | Holston et al. |
| 6,929,111 B2 | 8/2005 | Rovers |
| 7,108,155 B2 | 9/2006 | Kelbert et al. |
| 7,159,375 B2 | 1/2007 | Hellmann et al. |
| 7,464,806 B2 | 12/2008 | Borkiewicz et al. |
| 7,497,319 B2 | 3/2009 | Boldrini et al. |
| 7,624,856 B2 | 12/2009 | Monti |
| 8,272,497 B2 | 9/2012 | Kaes et al. |
| 2007/0108218 A1 | 5/2007 | Schmetzer |
| 2010/0147650 A1 | 6/2010 | Kaes et al. |

FOREIGN PATENT DOCUMENTS

| | | |
|---|---|---|
| DE | 10 2006 005397 A1 | 8/2007 |
| DE | 10 2007 021146 A1 | 11/2008 |
| EP | 0 613 838 A1 | 9/1994 |
| EP | 0 496 046 B1 | 1/1995 |
| EP | 0 695 703 A1 | 2/1996 |
| EP | 0 778 203 A2 | 6/1997 |
| EP | 0 995 702 A1 | 4/2000 |
| GB | 1044284 | 9/1966 |
| WO | WO 99/61359 | 12/1999 |
| WO | WO 2011/083854 A1 | 7/2011 |

* cited by examiner

METHOD FOR PACKAGING LOW COUNT PACKAGES OF ABSORBENT ARTICLES

CROSS REFERENCE TO RELATED APPLICATIONS

This application claims the benefit of U.S. Provisional Application No. 61/333,322, filed May 11, 2010.

FIELD OF THE INVENTION

A method for packaging disposable absorbent articles during a high speed manufacturing process is disclosed. More specifically, disclosed is a method for providing low count packages of absorbent article at high speed with reduced incidence of undesirable process interruption.

BACKGROUND OF THE INVENTION

Wearable absorbent articles (e.g., taped diapers, pull-on diapers, training pants, sanitary napkins, panty liners, incontinence briefs, and bandages) offer the benefit of receiving and containing the bodily exudates of a wearer. Disposable varieties of such absorbent articles are commonly known, and are typically mass produced on a high speed production line. In developed countries such as those in Western Europe and North America, manufacturing line speeds for producing disposable absorbent articles typically exceed 400 products per minute ("PPM"). That is, more than 400 absorbent articles are able to be produced per minute of operation. Packages of absorbent articles sold at retail outlets in developed countries may contain anywhere from more than 10 articles per package to more than 50 articles per package (e.g., 20-count, 40-count or even 160-count). However, less developed countries and countries where the majority of the population has relatively little disposable income, sometimes referred to as "low income markets" or "LIMs", consumers may not be able to afford to purchase the higher-count packages of disposable absorbent articles, even though such articles may provide superior performance benefits. In order to realize the benefit of superior product performance at a lower cost, consumers in low income markets may choose to use premium disposable absorbent articles or disposable absorbent articles in general less frequently than consumers in higher income markets. For example, instead of applying a disposable diaper to a child multiple times throughout the day, as is often done in higher income markets, consumers in low income markets may use a lower quality disposable diaper or no diaper at all on a child during the day and only put a higher quality disposable diaper on the child at bedtime. In response to this consumer niche, at least some manufacturers of disposable absorbent articles provide low-count packages of disposable absorbent articles (e.g., 10 articles or less) in low income markets, which are more affordable to lower income consumers.

Currently, providing low count packages of disposable absorbent articles such as diapers and training pants is problematic because current manufacturing processes typically run at line speeds which are too fast for packaging low numbers of articles per package. Known processes for packaging stacks of articles typically use an intermittent process. That is, one or more components in the process are required to start and stop in order to provide the desired stack of articles. An example of an intermittent stacking process is disclosed in U.S. Pat. No. 6,089,820. In some known intermittent processes, the stacker, the extractor (i.e., a component that removes articles from the stacker), and/or other process equipment may come to a complete stop in order for articles to be removed from the stacker or moved through the manufacturing process. Once the articles are removed, the stacker and/or extractor restart and accelerate to the desired process speed to process the next stack of articles. While this may be suitable for a high count packaging process, it may not be suitable for low count packaging processes. For example, when going from a 20-count package to a 5-count package, the required number of packages increases by a factor of four for the same number of articles produced. Thus, assuming the rate of article production remains unchanged, the speed of the downstream packaging process must be increased by a factor of four to accommodate the increased number of required packages. In other words, the intermittent components in the process must now stop, start, and accelerate four times as often as before. Such an increase in the starting and stopping of components may cause substantial increased wear on the equipment and require a change in the size of the process equipment or an increase in the size of the motor driving the equipment. Not surprisingly, some manufacturing processes are unable to accommodate the increase in package process speed without undesirably impacting the manufacturing process (e.g., equipment jams/failures, package miscounts, process slow-downs). Because there is a demand in low income markets for a manufacturer's product, the manufacturer may, at least in some instances, resort to manually packaging articles. However, packaging articles by hand is generally slower and more labor intensive than an automated process, and may result in an undesirable increase in workforce or reduction in capacity (i.e., fewer packages of articles).

While some attempts to provide a process for making low-count packages of disposable absorbent articles have been made, such attempts have only resulted the undesirable slow down of portions of the manufacturing process (e.g., through the use of vertically oriented screw stackers such as are disclosed in U.S. Pat. Nos. 6,089,820 and 6,149,378) or the undesirable use of space-consuming equipment (e.g., horizontally oriented stackers such as are disclosed in U.S. Pat. No. 6,698,579). Efforts to provide low-count packages of articles such as, for example, disposable diapers have resulted in undesirable impacts to the manufacturing process, increased product defects, rejections, and overall waste.

Accordingly, it would be desirable to provide a suitable process for making low-count packages of articles at high speeds. It would also be desirable to provide a continuous process for making low-count packages of articles at high speeds. It would also be desirable to provide such a process without the need for space-consuming equipment.

SUMMARY OF THE INVENTION

In order to provide a solution to the problems set forth above, at least one embodiment of the process disclosed herein provides a method for providing low count packages of absorbent articles in a high speed manufacturing process. The method includes a conveying means for conveying absorbent articles, and conveying a plurality of absorbent articles in a machine direction to an infeed of a continuously rotating stacker. The stacker comprises a plurality of cassettes, each cassette being configured to receive at least one absorbent article. The method further comprises sequentially inserting at least one absorbent article into at least one cassette at the infeed of the stacker, such that a plurality of absorbent article containing cassettes is provided. The method also comprises transporting the absorbent article containing cassettes around a periphery of the continuously rotating stacker to an extraction station at an outfeed of the stacker. The extraction station includes an extractor configured to remove at least one absorbent article from at least one absorbent article containing cassette. At least a portion of the extractor is non-parallel to the cassette at the outfeed of the stacker. The method also comprises extracting at least one absorbent article from at least one absorbent article containing cassette. The method also comprises conveying the extracted absorbent article(s) to a downstream packaging station. The method also comprises packaging the absorbent article(s) into a low count package.

DETAILED DESCRIPTION OF THE INVENTION

Definitions

Figure 1:
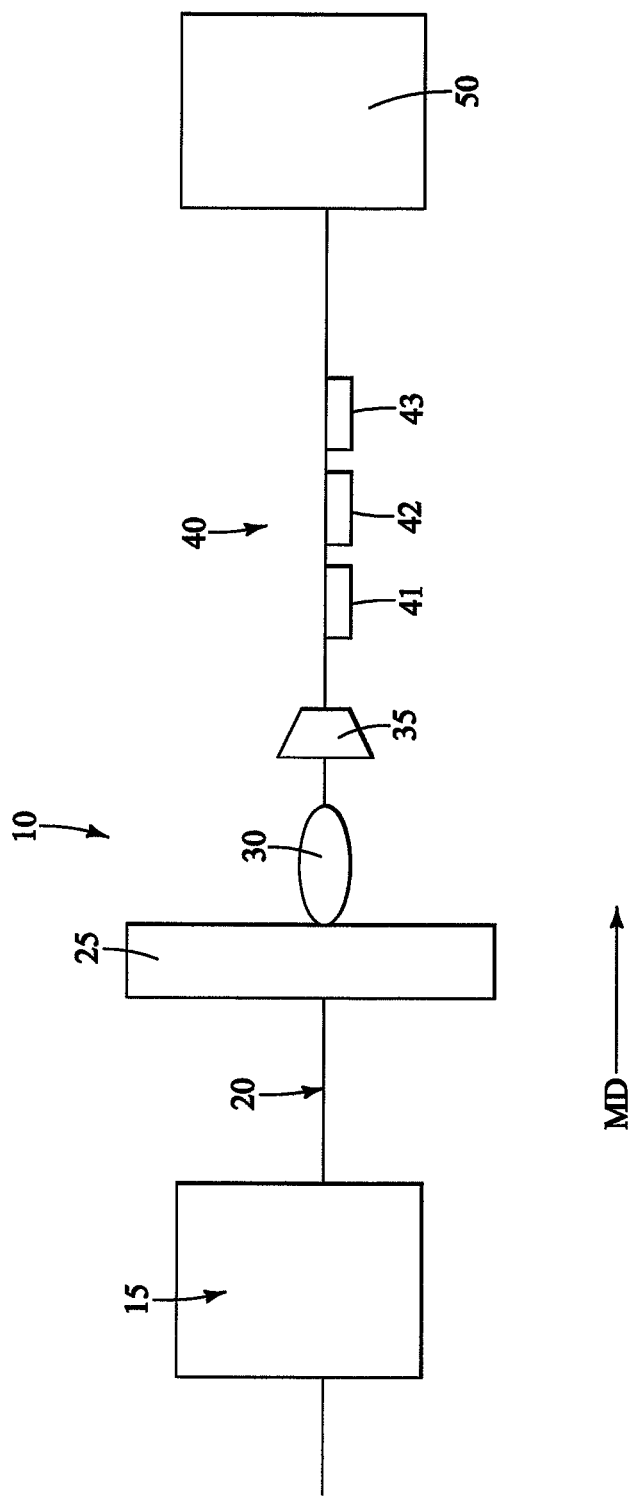
FIG. 1 is a plan view of an exemplary process.

"Absorbent article" means an article that absorbs and/or contains liquid. Wearable articles are articles placed against or in proximity to the body of a wearer, Wearable absorbent articles are absorbent articles placed against or in proximity to the body of a wearer to absorb and contain various exudates discharged from the body. Nonlimiting examples of wearable absorbent articles include diapers, pant-like or pull-on diapers, training pants, sanitary napkins, tampons, panty liners, incontinence devices, and the like.

"Comprising" means that the various components, ingredients, or steps, can be conjointly employed in practicing the disclosed process. Accordingly, the term "comprising" encompasses the more restrictive terms "consisting essentially of" and "consisting of."

"Disposable" means absorbent articles which generally are not intended to be laundered or otherwise restored or reused as an absorbent article (i.e., they are intended to be discarded after a single use and, preferably, to be recycled, composted or otherwise disposed of in an environmentally compatible manner).

"Disposed" means the placement of one element of an article relative to another element of an article. For example, the elements may be formed (joined and positioned) in a particular place or position as a unitary structure with other elements of an article or as a separate element joined to another element of the article. When one element is disposed on another element, the elements or portions thereof may be in direct contact with one another, or the elements or portions thereof may be separated, for example, by the joining means (e.g., adhesive).

"High speed manufacturing process" means a manufacturing process capable of producing over 400 PPM (e.g., from 400-2000 PPM; 600-1500 PPM; or 800-1200 PPM).

"Horizontal" and variations thereof mean substantially parallel to the plane defined by substantially level ground or a level floor that supports the equipment utilized in the process described herein.

Horizontal stacker means a stacker that rotates generally in a horizontal plane (i.e., the stacker rotates about an axis that is substantially parallel to the vertical direction).

"Low number" means 10 or less. For example, 10, 9, 8, 7, 6, 5, 4, 3, 2, or 1.

"Machine direction" ("MD") is the direction parallel to the direction of travel of the web or article in a manufacturing process. Directions within 45 degrees of the MD are considered to be machine directional. The "cross-machine direction" ("CD") is the direction substantially perpendicular to the MD and in the plane generally defined by the web or direction of travel of an article. Directions within 45 degrees of the CD are considered to be cross-machine directional.

"Vertical" and variations thereof mean substantially perpendicular to the plane defined by the level ground or level floor that supports the equipment utilized in the process described herein.

"Vertical stacker" means a stacker that rotates in a generally vertical plane (i.e., rotates about an axis that is substantially parallel to the horizontal direction).

"Web" means a material capable of being wound into a roll. Webs may be films, nonwovens, laminates, apertured laminates, and the like.

"X-Y plane" means the plane defined by the MD and CD of a moving web or the length and width of a piece of material.
Process Traditional packaging processes typically require intermittent operation of certain components in the process. When attempting to produce low-count packages of articles, intermittent operation of equipment may undesirably limit the number of articles that can be put in a single package. Surprisingly, the continuous process disclosed herein reduces or even eliminates at least some of the problems that require traditional processes to operate intermittently, thus providing a new and improved method for the production of low-count packages of articles. While some embodiments described herein may refer to a process for providing low-count packages of disposable diapers, training pants and the like, it is to be understood that the present process is not limited to such embodiments, but may in fact be practiced to great advantage with any suitable flexible, flat article. For example, the process may be used to provide low-count packages of feminine hygiene products such as tampons, sanitary napkins, panty liners, or adult incontinence articles.

Certain properties described herein may include one or more ranges of values. It is to be understood that these ranges include every value within the range, even though the individual values in the range may not be expressly disclosed.

The high speed process herein may include a conveyor for transporting articles through the manufacturing process. Conveyors suitable for use herein include conveyors and/or combinations of conveyors generally known in the art for transporting articles in a manufacturing process. For example, suitable conveyors include, without limitation, devices that have an endless surface such as a commonly known conveyor belt, a roll, a pair of rolls or belts, and the like. In certain embodiments, the conveyor may be configured as single belt that has a horizontal surface for supporting and transporting an article. In certain embodiments, the conveyor may be configured as two or more belts which cooperate with another to transport articles in a horizontal, vertical, or diagonal direction. For example, the conveyor may be configured as a twin-belt conveyor, which includes two parallel belts positioned in a close, face-to-face arrangement such that an article (e.g., folded diaper or sanitary napkin) may be conveyed between the opposing faces of the belts. The conveyor may continuously or intermittently operate at a single speed or a variable speed. In certain embodiments, the conveyor may transport individual articles in series. Alternatively or additionally, the conveyor may transport stacks of two or more articles (e.g., 3, 4, 5, 6, 7, 8, 9, or even 10) in series in the MD. In some embodiments, twin-belt conveyors may be used to provide top-and-bottom guidance to the articles at specific points in the stacking and packaging process, or continuously through the entire stacking and packaging process, or substantially continuously through the entire process (i.e., with short gaps at points of transfer and/or unit operations, but otherwise continuously through the entire stacking and packaging process).

In certain embodiments, the conveyor serially transports articles to the infeed side of a stacker. The infeed of the stacker is the portion of the stacker where an article may be inserted. The stacker may be a horizontal stacker or a vertical stacker. Vertical stackers typically occupy less floor space than commonly known horizontal stackers, and therefore may be more desirable in certain manufacturing processes. The stacker may include a plurality of discrete cassettes configured to sequentially receive the serially transported articles from the conveyor, and then transport the articles to the outfeed side of the stacker. The outfeed of the stacker is where an article may be extracted from a cassette. The cassettes may be configured as blocks of cassettes. That is, two or more cassettes may be joined to one another or formed as an integral unit. For example, a block of cassettes that has 2, 3, 4, 5, 6, or any number of individual cassettes may be formed as an integral unit in a single injection-mold die. Multiple blocks of cassettes may be individually affixed to a drive mechanism that moves each block of cassettes in an endless path (e.g., circular, or elliptical, or any other desired shape) around the periphery of the stacker. The cassettes may be joined to the stacker by any suitable means commonly known in the art including, without limitation, chains, belts, tracks, and the like. For example, the cassettes may be joined to a track driven by one or more gears and/or pulleys coupled to a servo drive motor. In such an example, the cassettes may include rollers that roll along the track. The cassette may be joined to the track by, for example, with one or more pins or other mechanical attachment means, which permit the cassette to at least partially rotate about an axis that is parallel to the axis of rotation of the stacker as the cassette travels around the periphery of the stacker. Known prior art stackers sometimes use individual paddles to form cassette-like structures between the individual paddles. Individual paddles may be undesirable for use in the present process because they are known to shake or vibrate, which may result in a general lack of stability in the stacker, jams, and/or improper stack sizes at the outfeed of the stacker. It is believed that by using blocks of cassettes, the overall stability of each cassette in the block is improved by the integral structure of the cassette block, and therefore articles can be delivered more reliably to the outfeed of the stacker to form the desired stack.

Cassettes suitable for use herein may include a pair of opposing top and bottom walls that define a receiving space therebetween. The thickness of the walls and the size of the space between the walls depends on the type of article being manufactured, and may vary widely. When the wall thickness varies along the length of the wall, the thickness is determined by the maximum thickness measured. Similarly, the space between the walls is measured between the thickest portions of the walls. The cassettes include an open receiving end at the front of the cassette for receiving articles and a back end positioned opposite the front end. The back end of the cassette is generally configured to limit the distance an article can be inserted into the cassette (e.g., acts as backstop). For example, the back end of the cassette may be formed from a unitary wall that extends along a portion or even the entire back side (i.e., the side that faces the axis of rotation of the vertical stacker) of the cassette and/or cassette block. The back end of the cassette may be at least partially closed off so that an article inserted into the cassette cannot pass through the back end of the cassette (e.g., acts as a backstop). In another example, the back end of the cassette may formed from one or more bars or ribs that extend between the top and bottom walls and/or between any side walls that may be present, such that an article inserted into the cassette is prevented from substantially passing through the back end. In this example, one or more openings may be formed between the ribs and/or bars such that a portion of the article in the cassette is capable of at least partially extending past the back end of the cassette; however, this is not considered to be substantially passing through the back end as long as the article is capable of being removed as intended at the outfeed of the stacker. In certain embodiments, the closed end may be joined to the stacker directly or to an intermediate element which is joined to the stacker. In certain embodiments, one or both of the sides of the cassette may be at least partially open or closed, as desired. For example, one or both sides of the cassette may include a wall that at least partially extends between at least a portion of the top and bottom walls of the cassette, and thereby further defines the interior space of the cassette along with the top and bottom walls and front and back ends of the cassette. In another example, the stacker may include a panel that extends along the length of stacker and is positioned proximate to at least one side of a cassette. The panel may act as a wall for the at least the side of the cassette the panel is disposed next to.

During a typical high speed operation, an article in the cassette may be subjected to a significant amount of centrifugal force as the article travels around the periphery of the stacker at a relatively high rate of speed. The centrifugal force may cause the article to exit the cassette prematurely (e.g., before reaching the outfeed of the stacker), which is generally undesirable. Thus, in certain embodiments, the cassette is configured to constrain the article so that is does not exit the cassette prematurely. For example, one or both of the top and bottom walls of the cassette may include regions of different thickness. Continuing with this example, the top and/or bottom wall may be tapered, such that the space separation between the opposing faces of the top and bottom walls gradually decreases from the front end of the cassette to the back end. Thus, the tapered back end of the cassette may provide a snug fit to help keep the article in the cassette. When the cassettes are configured as blocks of cassettes, it may be desirable to vary the thickness of the walls of the cassette depending on where the wall is positioned in the block. For example, a block of cassettes having six individual cassettes may be configured to have two outermost walls (i.e., the top wall of one of the outermost cassettes in the block and the bottom wall of the other outermost cassette in the block) and 5 inner walls (i.e., walls disposed between the two outermost walls of the block of cassettes). The two outermost walls of the block of cassettes in this example may be thinner than the inner walls (e.g., half as thick). Therefore, the outer wall of one block of cassettes may fit snugly with the outer wall of another block of cassettes when the two blocks of cassettes are positioned immediately adjacent to one another, and thereby effectively increase the thickness of each of the outer walls (e.g., double the thickness of each wall, if each wall has the same thickness). Additionally or alternatively, the top and/or bottom wall of each cassette may have a stepwise change in thickness such that the distance between the opposing faces of the top and bottom walls undergoes a step change somewhere between the front and back end of the cassette. In these examples, the wider opening at the front may facilitate insertion of an article into the cassette, and the narrower back end may provide a suitable amount of pressure on the article (i.e., provide a snug fit) to hold the article in place. In yet another example of an embodiment, the cassette may include one or more projections which are positioned or formed to at least help hold an inserted article in place, but not substantially impede the insertion of the article into the cassette. In such an example, the cassette may include one or more inwardly-angled, flexible barbs, projections, and/or other similar features that provide sufficient holding force on the article to resist the centrifugal force produced by the rotation of the stacker. In yet another example, one or more portions of the stacker may be fitted with a shroud that is positioned to provide a blocking surface relatively close to the open end of the cassette. In this example, the shroud may be positioned at one or both of the curved ends of an elliptically shaped stacker, where the centrifugal force exerted on the articles in the cassettes is relatively high. Thus, as an article starts to leave a cassette, the article will contact the surface of the shroud and thereby be blocked from undesirably exiting the cassette.

In certain embodiments, the articles being inserted into the cassettes may be folded (e.g., bifolded or trifolded). In such embodiments, it may be desirable to insert the article into the cassette folded edge first. However, it may also be desirable, in certain embodiments, to insert a folded article into a cassette with the unfolded edge first.

The rotation of the cassettes around the periphery of the stacker may be controlled by any suitable means commonly known in the art such as, for example, one or more servo motors operatively coupled to the stacker. A stacker suitable for use herein may operate continuously during a normal steady state manufacturing process, as opposed to the intermittent operation (i.e., starting and stopping) of some commonly known stackers. The rotational velocity of the stacker may be constant or variable. In certain embodiments, the rotation velocity of the stacker may be adjusted to compensate for process variability such as, for example, a change in the vertical or horizontal position of the stacker, which is described in more detail below, or a change in the number of articles in a stack.

In addition to moving the cassettes around its periphery, the entire stacker may be configured to move vertically up and down or horizontally back and forth, depending on whether the stacker is vertically or horizontally oriented, to compensate for process variability. For example, the rate at which articles are inserted into the cassettes of the stacker (i.e., "infeed rate") may not always be constant. In this example, one or more articles may contain undesirable defects that are detected by an upstream process. Typically, a defective article(s) is removed from the manufacturing assembly line prior to reaching the stacker. But removing the defective article may leave a gap in the line of serially transported articles. If the gap is not somehow recognized and compensated for prior to reaching the infeed of the stacker, it may result in one or more empty cassettes in the stacker, depending on the number of defective articles removed. Since the purpose of a stacker is generally to provide stacks of articles having a predetermined number of articles in each stack, it would be undesirable to have an empty cassette, which may subsequently result in a stack of articles that does not have the desired number of articles in it. By configuring the stacker to move in direction perpendicular to its axis of rotation, the stacker may be able to compensate for gaps in the serially-transported, sequentially-inserted articles. The positioning of the stacker may also be changed to provide a buffering capacity for the stacker. For example, the vertical position of a vertical stacker may be changed (i.e., moved up or down) to effectively create more cassettes between the infeed and outfeed of the vertical stacker in the machine direction. This effective increase in the number of cassettes results in a corresponding increase in the number of articles that can stored between the infeed and outfeed of the vertical stacker.

In some embodiments, each individual cassette, or groups of cassettes (i.e., more than one cassette but less than all of the cassettes in the stacker) may be independently driven, as by an independent servo motor. Such embodiments may permit a cassette to remain at the infeed until the cassette is full, thereby reducing or eliminating the problem of incomplete stacks discussed above. Independently driven cassettes or groups of cassettes may also facilitate the adjustment of the position of a specific cassette, as described elsewhere in this disclosure, to provide additional means of compensation for process variables, including rejects, mismatched speeds between adjacent pieces of manufacturing equipment, and the like. Independently driving each individual cassette may provide increased process flexibility and control, while independently driving groups of cassettes may somewhat simplify the control system and apparatus. Each cassette or group of cassettes may be driven by a single independent motor, or by two or more motors acting in concert with one another, but independent of the motor(s) associated with other cassettes or groups of cassettes. If groups of cassettes are controlled separately, the groups may include a number of cassettes consistent with the desired number of articles in a stack. For example, a group of cassettes may comprise 1, 2, 3, 4, 5, 6, 7, 8, 9, or 10 cassettes. In some embodiments, all of the cassettes may be controlled by a single driving motor or force, or by a collection of driving motors or forces acting in unison.

When cassettes containing articles reach the outfeed of the stacker, the articles are removed from the cassettes by an extractor and transported by the extractor to a downstream process and/or process component. The extractor may be configured to simultaneously remove a number of articles desired in a stack (e.g., 1, 2, 3, 4, 5, 6, 7, 8, 9, or even 10 articles at a time). The extractor may include an endless surface such as one or more belt or rolls that act cooperatively with the stacker to permit continuous operation of the stacker and, optionally, the extractor. The extractor may operate continuously at a single speed or two or more different speeds. In one example of an embodiment, the extractor may include a pair of opposing belts disposed on either side of the stacker such that the extractor is capable of contacting both sides of an article in a cassette. In this example, each of the opposing belts may include an extraction element such as one or more fingers, paddles, combs, tines and the like for contacting the articles in the cassettes and moving the articles out of the cassettes. The extraction element may be disposed on the rotating surface of one or both extraction belts such that when the extraction element passes by the cassettes, the extraction element engages one or more articles and extracts them from the cassette. When the extractor extracts two or more articles simultaneously, a stack of articles is formed corresponding to the number of articles removed. The size of the extraction members, the speed of the extractor, and the speed and/or position of the stacker may be manipulated to change the number of articles in a stack. For example, the position of the stacker may be altered to compensate for a rejected article at the infeed of the stacker, and the speed of the stacker may be adjusted to compensate for the change in position of the stacker (i.e., the relative change in speed observed at the outfeed of the stacker caused by the change in position), thereby maintaining a substantially constant feed rate at the outfeed of the stacker. In this example, the speed of the extractor belts may be adjusted to compensate for and/or track the speed change of the stacker. In order to permit continuous operation of the stacker, it may be desirable to position the extractor at an angle relative to the cassettes at the outfeed of the stacker. In certain embodiments, the cassettes generally extend horizontally and substantially parallel to one another when they reach the outfeed of the stacker. Because the stacker operates continuously, the cassettes will continue to move as articles are being extracted from the cassettes. By orienting the extractor or portions thereof (e.g., the surface of the extractor that supports the absorbent articles and/or the belts) to include an angle relative to the horizontally oriented cassettes (e.g., a downward angle in a vertical stacker), the relative change in position between the extraction members and the walls of the cassette due to the moving stacker can be reduced or even eliminated. Suitable angles for the extractor include angles of greater than 0° but less than 20°, relative to the cassette walls at the outfeed of the stacker. For example, between 0° and 10°, 2° and 7°, 3° and 6°. In certain embodiments, the extractor may be positioned at an angle of 4° or 5° relative to the cassette walls at the outfeed of the stacker. The angle of the extractor is determined by drawing an imaginary line parallel to the machine direction of the extractor (i.e., the direction that articles travel as they pass through the extractor) and measuring the angle formed between the imaginary line and the cassette wall(s) at the outfeed.

In certain embodiments, it may be desirable to provide a compressor. The compressor may receive a stack of articles from the extractor or an intermediate component between the compressor and the stacker and apply pressure to the stack of articles to compress (i.e., "squeeze") it into a more compact form. For example, the compressor may be configured to reduce the height of a stack of articles by up to 50% or more (e.g., between 10% and 50%, 20% and 40%, or 30%).

After compressing the stack to the desired height, the stack of articles may be transported from the compressor to one or more speed reducing stations. In certain embodiments, the speed at which the stack of articles is moving when exiting the extractor and/or compressor may be faster than desired. For example, it may be desirable to bring a stack of articles to a stop or reduce the speed of the stack or articles in order to suitably package the stack of articles. In certain embodiments, the desired reduction in speed may be provided by one or more smart belts that are each operatively coupled to a variable-speed synchronous motor. The smart belt(s) may be configured to receive an article or stack or articles at a first speed, which is matched to the upstream line speed, and then reduce the speed of the stack of articles to match a desired downstream line speed. It is to be appreciated that the smart belt(s) will accelerate and decelerate frequently during a high speed manufacturing operation. Thus, the greater the difference in article speed from the upstream process to the downstream process, the more power a drive motor may need to deliver to provide rapid acceleration of the belt. Since a motor's size is generally proportional to the amount of power it can deliver, a larger change in speed means more power is required, and thus a bigger motor. In order to reduce the size of the motor, since smaller motors may be more desirable, two or more smart belts may be arranged in series, wherein each smart belt reduces the speed of the article or stack of articles by a fraction of the total amount of speed reduction desired. In this way, two or more smaller motors may be used instead of a single large motor. For example, three smart belts may be configured in series with each smart belt operatively coupled to its own drive mechanism (e.g., one or more synchronous motors). In this example, the first smart belt in the series receives an article or stack of articles from an upstream process or component (e.g., extractor or compressor), at the line speed of the upstream process. Once the article or stack of articles has been received by the first smart belt, the surface speed of the first smart belt, and thus any article(s) disposed on the belt surface, is slowed to a first slower speed. The first smart belt then transfers the article or stack of articles to a second smart belt in the series. The second smart belt receives the article or stack of articles from the first smart belt at the first slower speed and then further reduces the speed of the article(s) to a slower second speed. This process of transferring article(s) and slowing the speed of the article(s) is then repeated with the third smart belt and/or any additional smart belts in the series. Once the speed of an article or stack of articles is reduced to a desired downstream speed, the article(s) are ultimately delivered to a packaging station where each article or stack of articles is packaged. The article(s) may be packaged by any suitable packaging process or device known in the art, such as a flow wrap packaging process or device.

FIG. 1 shows an exemplary high speed manufacturing process 10. In the process 10 shown in FIG. 1, articles are transferred in the MD from upstream forming processes 15 along a conveyor 20 to a stacker 25. The articles are received by the stacker 25 and transferred to an extractor 30 where the articles may be formed into stacks of two or more articles. Upon exiting the extractor 30, the height of the stack of articles may be reduced by a compressor 35. Still moving in the MD, the speed at which the stack of articles is travelling is adjusted at a speed control station 40. In certain embodiments, the speed control station 40 may include two or more belts or rolls (e.g., first, second, and third smart belts 41, 42, and 43, respectively). Finally, the articles continue along in the MD at a slower speed to a downstream packaging station 50.

Figure 2:
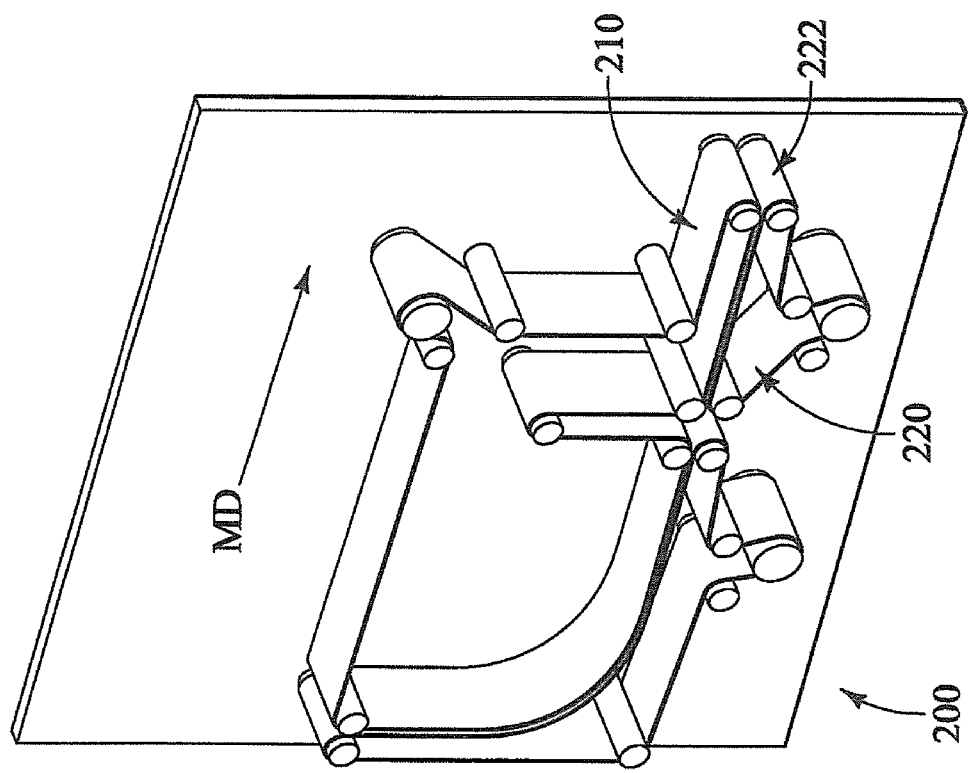
FIG. 2 is a perspective view of an exemplary conveyor.

FIG. 2 shows an exemplary embodiment of a conveyor 200. As shown in FIG. 2, the conveyor 200 may be a twin-belt conveyor 200. But it should be understood that the exemplary conveyor 200 configuration shown in FIG. 2 is only a portion of the whole conveyor 200, and other portions of the conveyor 200 may have configurations other than a twin-belt configuration. For example, portions of the conveyor 200 disposed upstream and/or downstream of the portion shown in FIG. 2 may be configured as a one or more single belt conveyors or even one or more rolls, as desired. As shown in FIG. 2, the conveyor 200 may include first and second opposing belts 210 and 220. The first and second belts 210 and 220 may be configured to define a space 222 between their opposing surfaces for transporting individual articles in series. When configured in this manner, the first belt 210, positioned above the article, contacts the top of the article and the second belt 220, positioned below the article, contacts the bottom of the article. Together the belts cooperatively move the article in the MD in a stable and controlled manner. In order to transport an article in the MD, it may be desirable to configure the first and second belts 210 and 220 to rotate in opposite directions of one another (e.g., the first belt 210 rotates clockwise and the second belt 220 rotates counterclockwise). The conveyor 200 generally transports articles in the MD to a stacker 250, where the articles are inserted into cassettes 255 at the infeed 260 of the stacker 250. The stacker 250 shown in FIG. 2 is configured as a vertical stacker.

Figure 3:
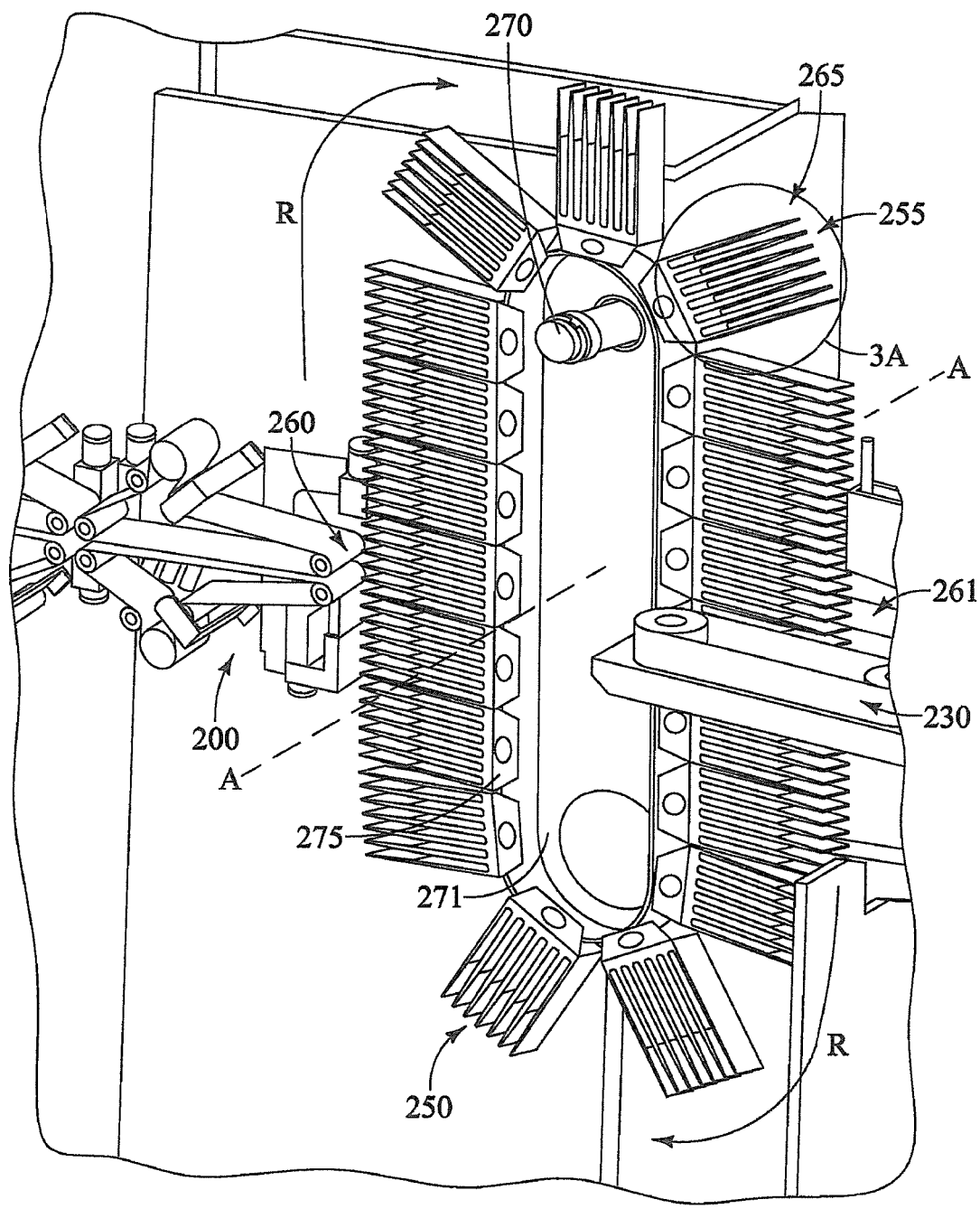
FIG. 3 is a perspective view of an exemplary stacker.

FIG. 3 shows an exemplary embodiment of a vertical stacker 250. The stacker 250 includes cassettes 255 arranged in plurality of discrete blocks 265. The discrete blocks of cassettes 265 move as a single unit around the periphery of the stacker 250 in a rotational direction R, for example, along guide track 275. The blocks of cassettes 265 may be joined to the guide track 275 by any suitable means commonly known in the art. The cassettes blocks 265 may be driven by one or more motors that are operatively coupled to the stacker 250, for example, by a shaft 270 and/or a pulley 271. In certain embodiments, only one of the shaft 270 and pulley 271 is driven and the other idled. As shown in FIG. 3, each block of cassettes 265 includes six individual cassettes 255; however, it is to be appreciated that each block 265 may include any number of cassettes 255, as desired (e.g., 2, 3, 4, 5, or even up to 10). The vertical stacker 250 shown in FIG. 3 has a horizontal axis of rotation, indicated by dashed line A-A. The stacker 250 includes an infeed 260 where articles are sequentially inserted into the cassettes 255 by the conveyor 200. The stacker 250 also includes an outfeed 261 where articles may be removed from multiple cassettes 255 simultaneously, for example by an extractor 230, to form a stack of articles. The circle 3A identifies the portion of FIG. 3 shown in the blow up view of a cassette block 265 in FIG. 3A.

Figure 3A:
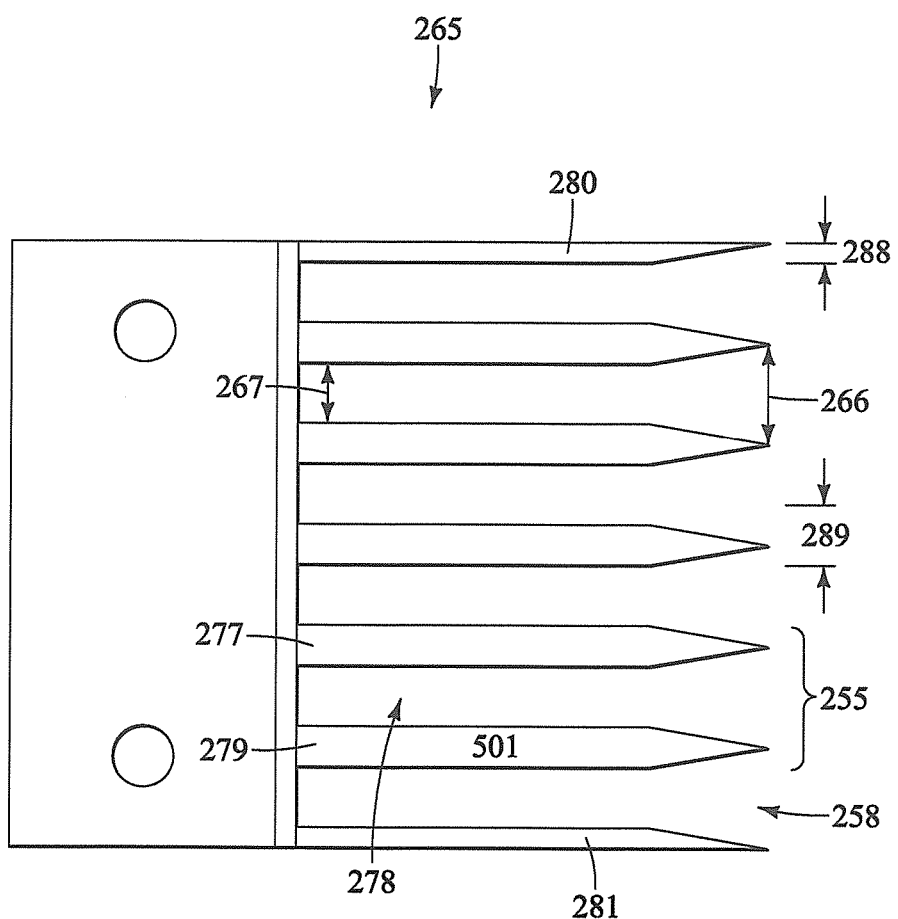
FIG. 3A is a plan view of an exemplary block of cassettes.

FIG. 3A shows an exemplary embodiment of a cassette block 265. The cassette block 265 includes six cassettes 255. Each cassette includes a top wall 277 and an opposing bottom wall 279 that define a space 278 therebetween for receiving an article. It is to be appreciated that while only a single cassette 255 is identified in FIG. 3A, the description of the cassette 255 (e.g., top wall 277, bottom wall 279, receiving space 278, open end 258) is generally applicable to each cassette 255 in the cassette block 265. The cassette block 265 may include two outer walls 280 and 281, which define the upper and lower boundaries of the cassette block 265, and five inner walls disposed between the two outer walls 280 and 281. Each wall in the cassette 255 has a thickness 288 or 289. The outer walls 280 and 281 have a first thickness 288 and the inner walls have a second thickness 289, which may be greater than the first thickness 288, but need not necessarily be so. In certain embodiments, a portion of the cassette 255 may have a tapered configuration to facilitate insertion of an article into the cassette 255. As shown in FIG. 3A, the thickness of at least a portion of the upper and lower walls 277 and 279 of the cassette 255 may be varied such that the distance between the upper and lower walls 277 and 279 decreases from the outermost point of the open end 258 of the cassette 255 to a point spaced inwardly from the open end 258. This concept is exemplified in FIG. 3A where the distance between upper and lower walls at position 266 is greater than the distance between the same upper and lower walls at position 267. While not shown in FIG. 3A, it may be desirable to provide at least one side wall on one or both sides of one or more of the cassettes to partially or fully enclose the receiving space 278 of the cassette, except for the open end 258.

Figure 3B:
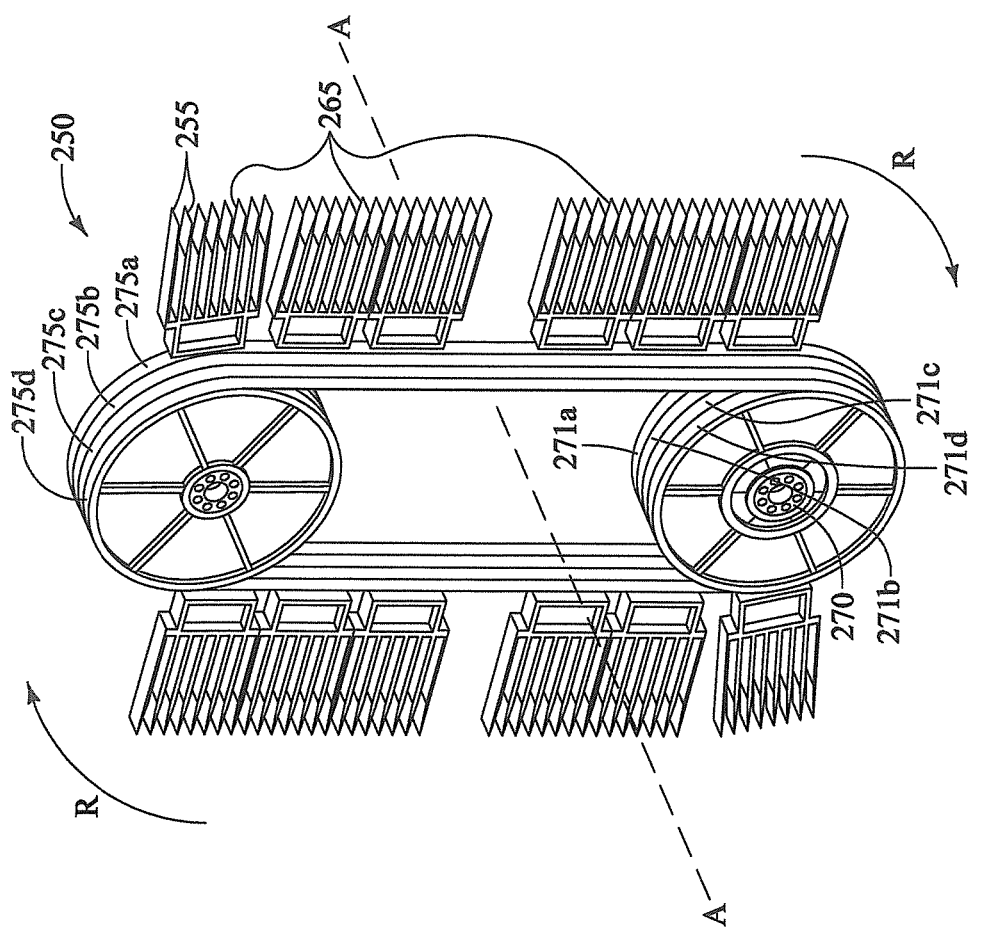
FIG. 3B is a perspective view of an exemplary stacker.

FIG. 3B shows an alternative exemplary embodiment of a vertically oriented stacker 250, in which cassette blocks 265 are independently driven. In the exemplary embodiment of FIG. 3B, groups of cassette blocks 265 are driven by different guide tracks 275a, 275b, 275c, and 275d. Guide tracks 275a, 275b, 275c, and 275d may be driven by pulleys 271a, 271b, 271c, and 271d, respectively, such that different cassette blocks 265 may move independently of one another. In other aspects, the operation of the vertical stacker of FIG. 3B is similar to the operation of the vertical stacker of FIG. 3. Exemplary mechanisms for independently driving cassette blocks 265 may be configured as described, for example, in U.S. patent application Ser. No. 13/047,355 to Papsdorf, et. al., filed Mar. 14, 2011.

Figure 4:
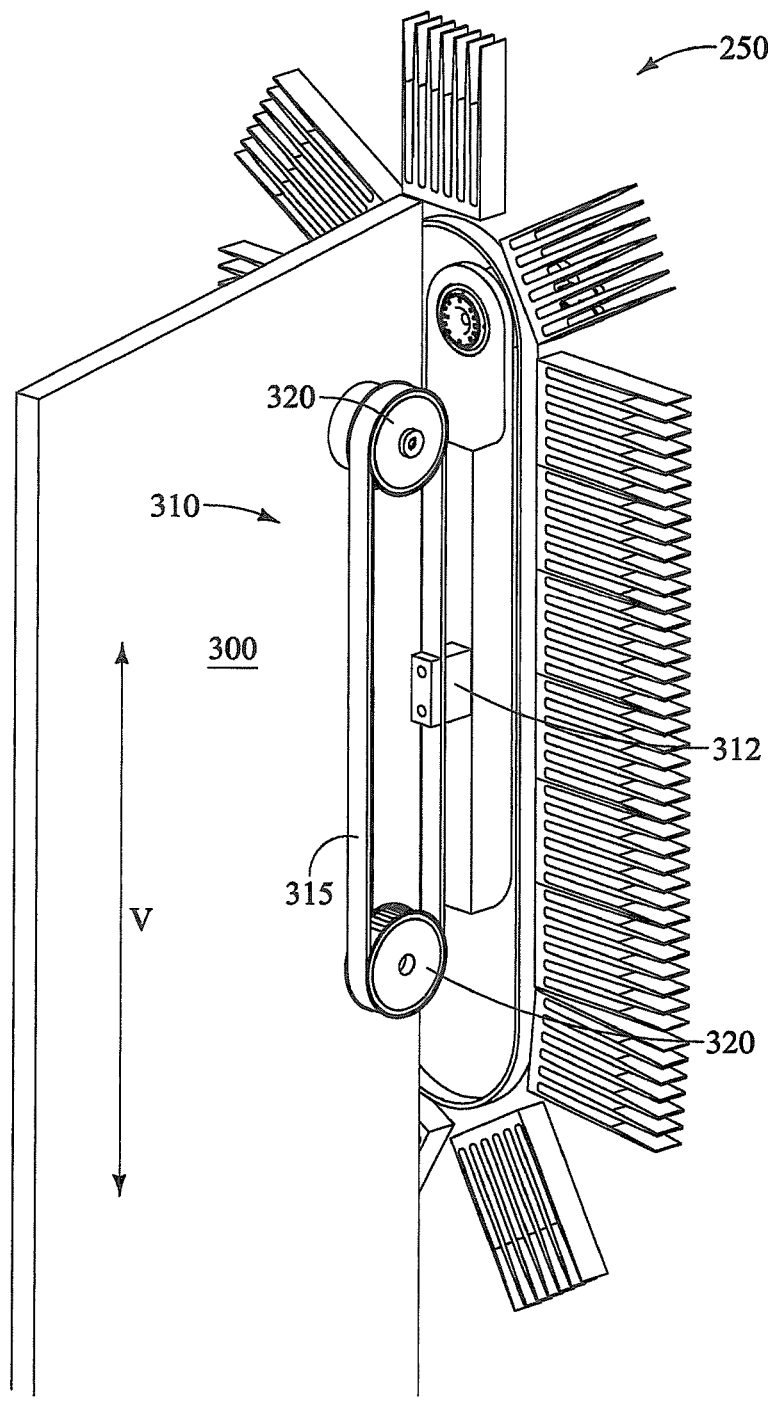
FIG. 4 is a perspective view of an exemplary stacker.

FIG. 4 shows an exemplary embodiment of a vertically oriented stacker 250. In certain embodiments, it may be desirable to move the entire stacker 250 in the vertical direction V. For example, if a defective article is detected by an upstream process and removed from the line, the sequential loading of the serially transported articles will result in an empty cassette, absent some compensatory response by the system. Thus, if the vertical stacker 250 depicted in FIG. 3 is moved downward while continuing to rotate in the clockwise direction R, then the empty cassette 255 positioned to receive the next article in series, which in this example would have been the defective article, will remain positioned at the infeed 260 for a longer amount of time, thereby permitting the next article (i.e., the article immediately following the defective article) to be inserted into the cassette 255. In another example, it may be desirable to change the vertical position of the stacker 250 to compensate for changes in the rotational speed of the stacker 250. As pointed out previously, the rotational speed of the stacker 250 may be changed to control the rate at which articles are removed from the cassettes 255 ("outfeed rate"). In some instances, the outfeed rate may be slowed to the extent that the outfeed rate is less than the infeed rate of the stacker 250. In such instances, it may be desirable to have some buffering capability. If the vertical stacker 250 depicted in FIG. 3 is moved upward while continuing to rotate in the clockwise direction R, then the number of cassettes 255 disposed between the infeed 260 and outfeed 261 is effectively increased. Thus, the stacker 250 is temporarily able to receive more articles than are being removed. In order to compensate for the change in position of the stacker 250, and thus the relative speed observed at the outfeed of the stacker 250, a corresponding change in the rotational speed of the stacker 250 may be implemented.

As shown in FIG. 4, the stacker 250 may be joined to a support structure 300, for example, by a support assembly 310. In certain embodiments, the support assembly 310 may include a belt 315 or similar feature (e.g., rope, chain, track), operatively connected to one or more pulleys 320. In certain embodiments, the stacker 250 may be joined to the support structure 300 with bolts or other suitable mechanical fastening means known in the art. One or more of the pulleys 320 may be driven by a drive motor and/or one or more of the pulleys 320 may be idled. The stacker 250 may be joined to the belt 315, for example, with a support coupling 312. As shown in FIG. 4, when the pulleys 320 rotate counterclockwise (from the viewer's perspective) the belt 315 and the support coupling 312 will act to move the stacker 250 upward. Conversely, when the pulleys 320 rotate clockwise, the stacker 250 is moving downward.

Figure 5:
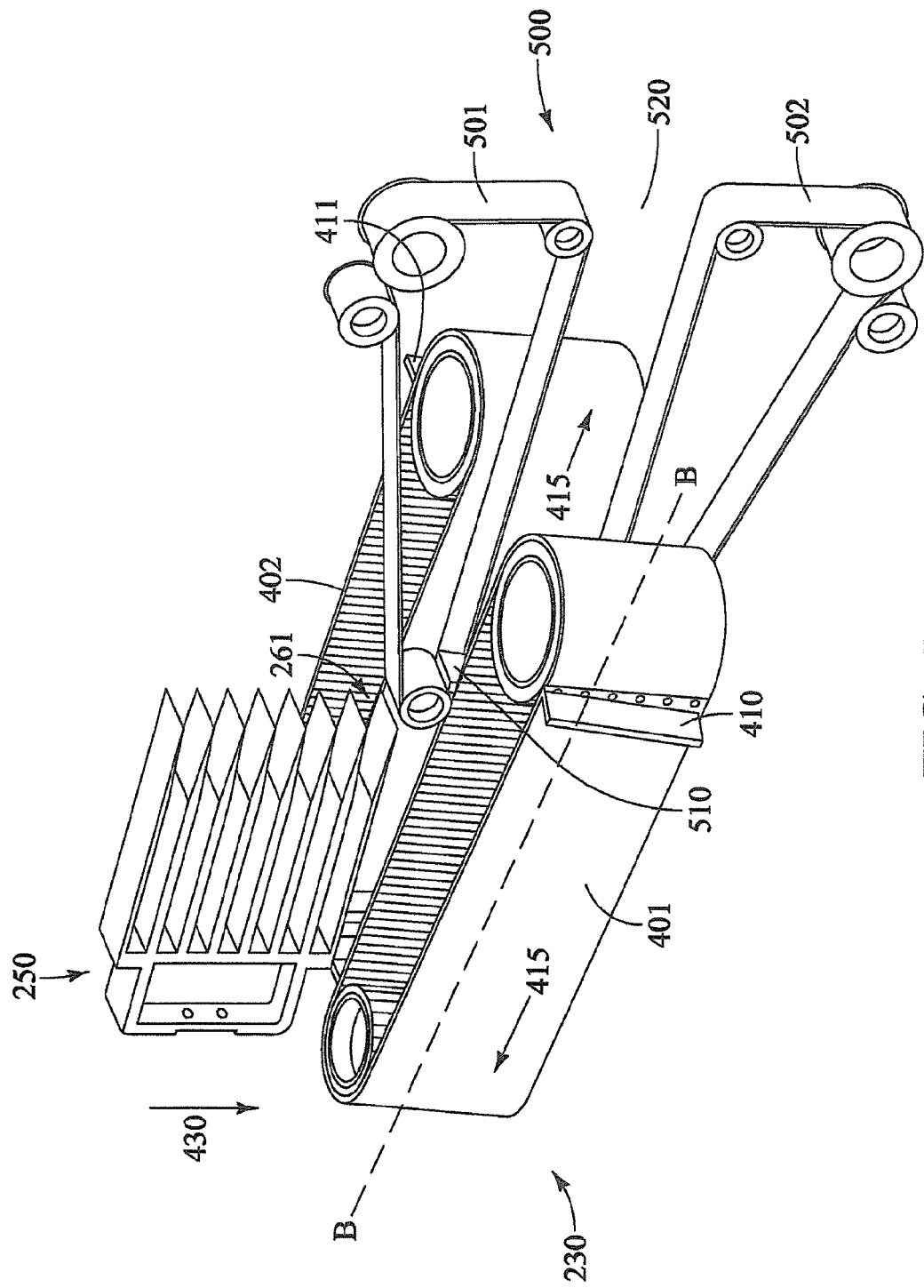
FIG. 5 is a perspective view of an exemplary extractor and compressor.

FIG. 5 shows an exemplary embodiment of an extractor 230. The extractor 230 is typically positioned at the outfeed 261 of the stacker 250. As shown in FIG. 5, the extractor may be configured as a pair of opposing belts 401 and 402 that rotate in opposite directions indicated by the direction arrows 415. Each belt 401 and/or 402 may include an engagement element such as the engaging "fingers" 410 and 411 shown in FIG. 5. The engaging fingers 410 and 411 may be configured to rotate on the surface of the belt(s) 401 and/or 402 and are periodically positioned proximate to the cassettes 255 of the stacker 250. The engaging fingers 410 and 411 may be configured to come into contact with the articles contained in the cassettes 255 such that extractor 230 is able to remove two or more articles from the cassettes 255 substantially simultaneously. For example, as seen in FIG. 5, a leading engaging finger 411 is positioned on the belt 401 proximate to the cassettes 255. The leading engaging finger 411 may have a length that spans, e.g., 5 cassettes. As the leading engaging finger 411 reaches the back end of the cassettes 255, it comes into contact with the back end of the articles inserted into the cassettes 255. Upon contacting the articles, the engaging finger 411 continues to move from the back end of the cassettes 255 to the front end of the cassettes 255, taking the contacted articles with it. When the leading engaging finger 411 passes the front end of the cassettes 255, the articles are considered to be completely removed from the cassettes 255 and form a stack of articles. While not shown, the opposing belt 402 may include complementary engaging elements of substantially the same size and positioning as the engaging fingers 410 and 411 shown in FIG. 5. In such an embodiment, the engaging fingers 410 and 411 and their complementary engaging elements may cooperate to remove articles from the cassettes 255 by simultaneously applying substantially the same amount of force to opposite sides of the articles and moving the articles out of the cassettes 255. The process may be repeated continuously as the engaging fingers 410 and 411 on the first belt 401 and, optionally, the complementary engaging elements disposed on the opposing belt 402 synchronously rotate around their respective belts 401 and 402. The rotational speed of the belts 401 and 402 may correspond to the rotational speed of the stacker 250 to provide a predetermined number of articles in each stack of articles. The rotation speed of the belts 401 and 402 may be varied automatically and/or manually, for example, to react to changes in the rotational speed of the stacker 250.

The stacker 250 may be configured to rotate in the clockwise direction (from the viewer's perspective) as indicated by direction arrow 430. Since the stacker 250 and the extractor 230 may operate continuously, the stacker 250 continues to rotate as the extraction fingers 410 and 411 move from the back end of the cassettes 255 to the front end of the cassettes 255 causing the relative position between a particular cassette 255 and the extractor 230 to change during the removal of articles from the cassettes 255. Thus, in certain embodiments, it is to be appreciated that as articles are being removed from the cassettes 255 by the extraction fingers 410 and/or 411, at least one of the cassettes may exit the outfeed 261 of the stacker 250 before the article in that cassette 255 is completely removed from the cassette 255. Without compensating for the continuous movement of the stacker 250, equipment jams or other undesirable process events may occur. For example, when a sequence of five cassettes moves toward and/or into the outfeed 261 of the stacker 250, the first cassette 255 in the series (i.e., the cassette 255 that reaches the outfeed 261 first) will be positioned lowest in the sequence of cassettes 255. In this example, the leading extraction finger 411 contacts the articles in the cassettes 255 as the cassettes enter the outfeed 261 of the stacker 250. But as the stacker 250 continues to rotate, the first cassette 255 begins to move out of the outfeed 261. If the extractor 230 is unable to completely remove the article from the first cassette 255 before the first cassette 255 exits the outfeed 261, then the article may get caught between the upper wall of the first cassette 255 and the extractor 230, possibly causing an equipment jam or damage to the article. To compensate for the continuous movement of the stacker 250, it may be desirable to position the extractor 230 at a predetermined angle relative to the cassettes at the outfeed 261 of the stacker 250, such that at a least portion of the first cassette 255 (e.g., the open end) remains in the outfeed 261 of the stacker 250 longer. For example, the cassettes 255 of the vertical stacker 250 shown in FIG. 5 are generally parallel to the horizontal direction at the outfeed 261 of the stacker 250. That is, the cassettes 255 extend away from the stacker 250 horizontally at the outfeed 261. In this example, the extractor 230 may be angled in a downward direction, as indicated by dashed line B-B, to form an angle of, e.g., five degrees relative to the walls of the cassettes 255 at the outfeed 261. As the cassettes move through the outfeed 261 of the stacker in the direction indicated by the arrow 430, it can be appreciated that the back end of the cassette will move past the extractor 230 (i.e., exit the outfeed 261) before the front end. Thus, additional time is provided for an extraction finger 410, 411 to move past the front end of the cassette 255 before the front end of the cassette 255 exits the outfeed 261. The extractor 230 may be positioned at any suitable angle desired depending on, for example, the number of articles in a stack or the speed of the stacker 250. In certain embodiments, it may be desirable to position the extraction fingers 410, 411 at an angle to compensate for the angle of the extractor 230.

FIG. 5 also shows an exemplary embodiment of a compressor 500. The compressor 500 may include first and second opposing belt assemblies 501 and 502. The belt assemblies 501 and 502 may be configured as endless surfaces rotating in opposite directions. In this way, a stack of articles may be moved through the compressor 500 in the MD. The compressor 500 includes a receiving end 510 for receiving a stack of articles from the extractor 230 and an exit end 520 for sending a compressed stack of articles to another component in the apparatus (e.g., a speed control device). The compressor 500 may be configured such that the distance between opposing belts surfaces is greater at the receiving end 510 than at the exit end 520. Thus, the distance between the opposing belts surfaces 501 and 502 decreases, resulting in a corresponding decrease in the height of a stack of articles as the stack of articles passes through the compressor 500. It is to be appreciated that the compressor 500 shown in FIG. 5 is exemplary, and any suitable means for compressing a stack of articles may used herein.

Figure 6:
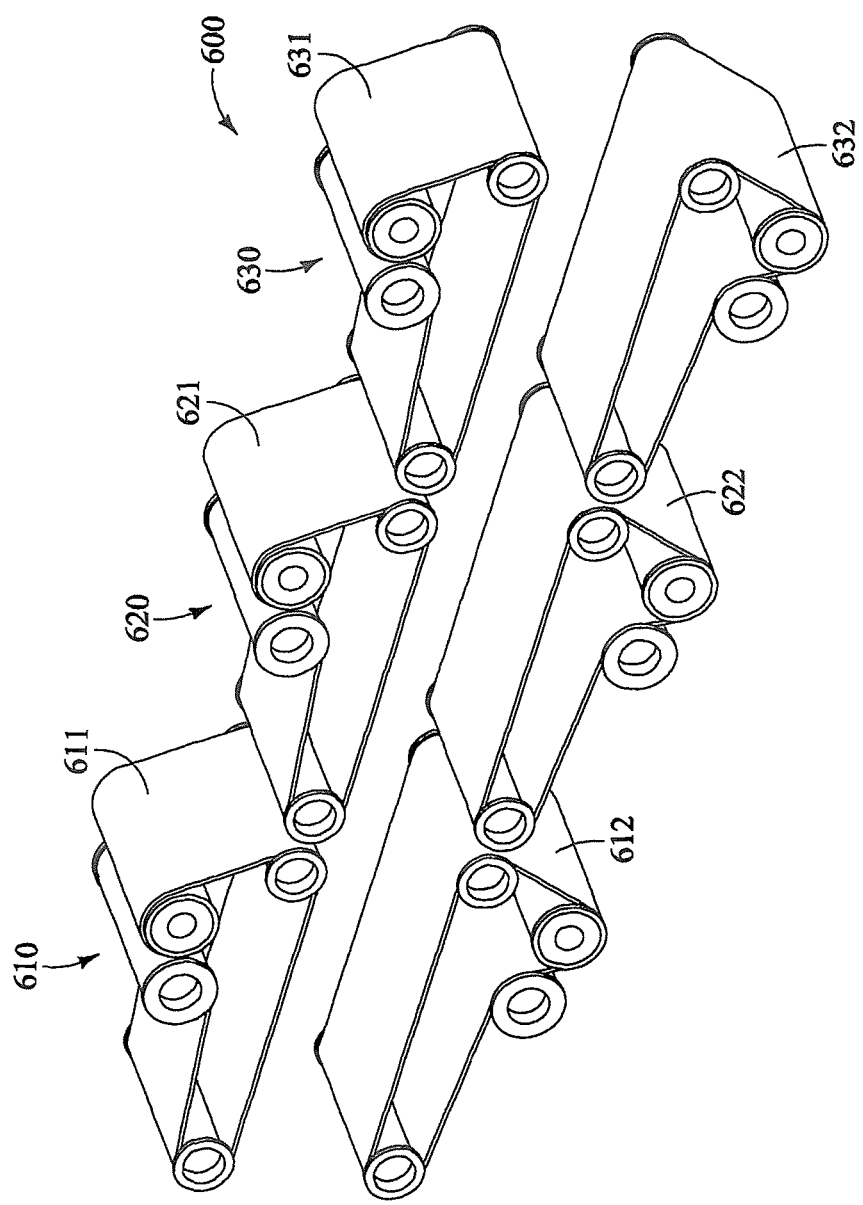
FIG. 6 is a perspective view of an exemplary speed control station.

FIG. 6 shows an exemplary embodiment of a smart belt assembly 600. The smart belt assembly 600 may include a series of smart belts 610, 620, and 630. Each smart belt 610, 620, and 630 may include, for example, a pair of opposing belts 611 and 612; 621 and 622; and 631 and 632 (or other endless surfaces) configured to move an article or stack of articles. The distance between the opposing belts 611 and 612; 621 and 622; and/or 631 and 632 may be configured to be substantially the same as the height of the stack of articles when the stack exits the compressor 500. Alternatively or additionally, the smart belt assembly 600 may be configured to provide additional compression or to allow the stack of articles to at least partially decompress. After changing the speed of stack of articles, the smart belt assembly 600 may move the stack of articles downstream to a packaging process where the articles are packaged into low count packages. Any suitable packaging device known in the art may be used in the present process.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for providing low count packages of absorbent articles during a high speed manufacturing process, the method comprising:
   conveying a plurality of absorbent articles in a machine direction to an infeed of a continuously rotating stacker, the stacker including a plurality of cassettes, each cassette being configured to receive at least one absorbent article;
   sequentially inserting at least one absorbent article into at least one cassette at the infeed of the stacker such that a plurality of absorbent article containing cassettes is provided;
   transporting the absorbent article containing cassettes around a periphery of the continuously rotating stacker to an extraction station at an outfeed of the stacker, the extraction station comprising an extractor configured to remove at least one absorbent article from at least one absorbent article containing cassette, wherein the extractor comprises a belt having an endless surface, wherein the endless surface of the extractor is positioned at an angle that is non-parallel to the cassette at the outfeed of the stacker;
   extracting at least one absorbent article from at least one absorbent article containing cassette;
   conveying the extracted absorbent article(s) to a downstream packaging station; and
   packaging the absorbent article(s) into one or more low count packages.

2. The method of claim 1, wherein the stacker is a vertical stacker.

3. The method of claim 1, wherein the angle is selected to at least partially compensate for the continuous rotation of the stacker.

4. The method of claim 3, wherein the angle is between 0 and 20 degrees.

5. The method of claim 1, wherein the process is capable of packaging between 400 and 2000 absorbent articles per minute in low count packages.

6. The method of claim 1, wherein two or more of the cassettes are configured as a block of cassettes.

7. The method of claim 1, wherein at least one of the opposing walls of the cassettes are tapered.

8. The method of claim 1, wherein the extractor simultaneously removes between 1 and 10 absorbent articles from the stacker.

9. The method of claim 8, wherein the extractor repeatedly removes one absorbent article from one absorbent article containing cassette to provide a series of individual absorbent articles which are moved to the packaging station to be individually packaged.

10. The method of claim 8, wherein between two and ten articles are extracted simultaneously by the extractor, the articles forming a stack of absorbent articles when extracted.

11. The method of claim 10, further comprising a compression station positioned downstream from the extraction station and upstream from the packaging station, the compression station including a compressor configured to apply a compressive force to the stack of absorbent articles.

12. The method of claim 11, wherein the compressor applies sufficient force to compress the stack of absorbent article by at least 20%.

13. The method of claim 1, wherein the extractor includes at least one pair of opposing belts, wherein each opposing belt comprises an endless surface.

14. The method of claim 13, wherein at least one of the belts includes at least one extraction element for applying an extraction force to the articles in the cassettes.

15. The method of claim 1, further comprising a speed control station, the speed control station configured to reduce the speed of an incoming absorbent article or stack of absorbent articles from an upstream line speed to a downstream line speed.

16. The method of claim 15, wherein the speed matching station includes a series of two or more smart belts, wherein each smart belt is configured to reduce the speed of the incoming absorbent article or stack of absorbent articles by a predetermined amount and wherein the speed of the absorbent article or stack of absorbent articles is reduced to the downstream line speed by the last smart belt in the series.

17. The method of claim 1, wherein at least one of the stacker and the cassettes is configured to prevent articles from exiting the cassettes prior to reaching the outfeed of the stacker.

18. The method of claim 1, wherein the absorbent article is a diaper or a pant.

19. The method of claim 18, wherein the absorbent article is bifolded prior to reaching the infeed of the stacker and inserted into the cassette fold-first.

20. A method for providing low count packages of absorbent articles during a high speed manufacturing process, the high speed manufacturing process including a conveying means for moving the absorbent articles through one or more portions of the manufacturing process, the method comprising:
   continuously moving a series of absorbent articles in a machine direction to a continuously rotating vertical stacker, the continuously rotating vertical stacker including a plurality of cassettes, each cassette including opposing top and bottom walls that define a space therebetween, each cassette being configured to receive one absorbent article, wherein at least one of the stacker and the cassettes is configured to retain the absorbent articles in the absorbent article containing cassettes during high speed travel around the periphery of the stacker;
   sequentially inserting one absorbent article into one cassette such that a plurality of absorbent article containing cassettes is provided;
   transporting the absorbent article containing cassettes around a periphery of the continuously rotating vertical stacker to an extraction station positioned at an outfeed of the stacker, the extraction station including an extractor configured to simultaneously extract between 2 and 7 absorbent articles at a time, the extractor including at least one pair of opposing belts wherein each belt includes at least one extraction element, wherein each belt comprises an endless surface, and wherein the endless surfaces of the belts are positioned at a downward angle of between 0 and 20 degrees relative to the top and bottom walls of the cassettes at the outfeed of the stacker, wherein the downward angle is selected to at least partially compensate for the continuous rotation of the stacker;
   simultaneously extracting absorbent articles from two or more cassettes at the outfeed of the extractor to form a stack of absorbent articles;
   reducing the speed of the stack of absorbent articles to a predetermined speed;

conveying the stack of absorbent articles to a packaging station; and packaging the stack of absorbent articles into a low count package.

\* \* \* \* \*